United States Patent [19]

Devries

[11] Patent Number: 5,271,849

[45] Date of Patent: Dec. 21, 1993

[54] PROCESS FOR TREATING WASTE CONTAINING CYANATES

[76] Inventor: Frederick W. Devries, 25 Hillendale Rd., Chadds Ford, Pa. 19317

[21] Appl. No.: 854,260

[22] Filed: Mar. 20, 1992

[51] Int. Cl.$^5$ .................................................. C02F 1/66
[52] U.S. Cl. ..................................... 210/747; 210/752; 210/758; 210/766; 210/904; 423/368
[58] Field of Search ............... 210/747, 749, 752, 766, 210/758, 904; 423/368, 378

[56] References Cited

U.S. PATENT DOCUMENTS

| | | | |
|---|---|---|---|
| 4,341,641 | 7/1982 | Novak | 210/904 |
| 4,689,156 | 8/1987 | Zibrida | 210/747 |
| 5,120,451 | 6/1992 | Costello et al. | 210/904 |

FOREIGN PATENT DOCUMENTS

| | | | |
|---|---|---|---|
| 759109 | 10/1956 | Canada | 210/904 |
| 51-43850 | 4/1976 | Japan | 210/904 |
| 56-78681 | 6/1981 | Japan | 210/904 |

OTHER PUBLICATIONS

"New Process Detoxifies Cyanide Wastes," *Environmental Science & Technology*, vol. 5, 1971, pp. 496–497.
J. Ingles & J. S. Scott, "State-of-the-Art of Processes for the Treatment of Gold-Mill Effluents", unpublished report of the Environmental Protection Service, Canada, (Mar. 1987), pp. i, 5.15–5.18.
I. A. Kempt G. Kohnstam, "The Decomposition of Inorganic Cyanates in Water" J. Chem. Soc. pp. 900, 901, 904, (1956).
J. Walker & S. A. Kay, "Velocity of Urea Formation in Aqueous Alcohol" J. Chem. Soc. 71 pp. 489, 495, 504, 508 (1897).
J. Walker & F. J. Humbly, "Transformation of Ammonium Cyanate into Urea" J. Chem. Soc. 67 pp. 746, 754–757 (1895).

*Primary Examiner*—Peter A. Hruskoci

[57] ABSTRACT

A process is provided for removing ammoniacal values of potential environmental concern, both present and latent, from cyanate-containing waste streams and water-wet waste solids, typically generated in gold leaching or electroplating operations. The process includes heating the waste material to a temperature in excess of 50° C. to convert ammonium cyanate to urea and optionally reducing pH to a range of 2.5 to 5 to accelerate hydrolysis of cyanate to ammonium carbonate, to supply ammonium ions for reacting with unhydrolyzed cyanate.

8 Claims, No Drawings

PROCESS FOR TREATING WASTE CONTAINING CYANATES

BACKGROUND OF THE INVENTION

1. Field of the Invention

This invention relates to a process for protecting the environment, the process involving treatment of an industrial, cyanate-containing waste stream so that it can be discharged into receiving waters without potentially harmful effects. More particularly, the invention concerns such a process in which the waste is treated to convert cyanates to urea and to decrease the ammonia content of the treated waste to a concentration that will not render the receiving waters harmful to aquatic species.

2. Description of the Prior Art

Cyanides, in the form of cyanide ions, hydrogen cyanide, metallocyanides and metallocyanide complexes, are used in a variety of industrial processes. For example, aqueous solutions of such cyanides are used to leach gold and silver directly from ores. Cyanides are also used in processes for electroplating gold, silver, platinum, iridium, copper, zinc, and the like. Such processes generate significant quantities of highly toxic cyanide waste. It is conventional to oxidize the waste cyanides to cyanate salts or cyanic acid (collectively referred to herein as "cyanates"), which are much less toxic than the cyanides from which they were derived. Because the cyanates are of low toxicity to mammalian and aquatic species, cyanate-bearing waste materials are often discharged at low concentrations (e.g., 0.2 gram/liter) into receiving waters (e.g., rivers, lakes and the like) where they are further diluted by a factor of ten or more.

Heretofore, the ultimate fate of cyanate-bearing materials discharged into receiving waters has generally been of little concern to environmentalists. However, the present inventor recognized that cyanates can generate ammonia and ammonium ions, that cyanate-bearing wastes often contain additional quantities of ammonia from other sources and that the presence of ammonia can be a serious environmental concern because ammonia can be toxic to fish even at very low concentrations.

Ammonia, ammonium ions and other ammoniacal residues (referred to collectively herein as ammonia) usually are present in cyanate-bearing waste streams, at concentrations of about a tenth to a hundredth of the cyanate concentration. Several possible sources contribute to the ammonia content of cyanate-bearing waste. These sources include cyanate decomposition, cyanide hydrolysis during processing of the ores and ammonium nitrate from explosives that were used during mining of the ores.

A conventional method for handling aqueous cyanate-bearing wastes often involves impounding the waste for long times in ponds. In the ponds, the cyanate is very slowly converted to urea and ammonia gas slowly escapes from the surface of the pond. In acidic ponds, the escape of ammonia is particularly slow.

An object of this invention to provide a process that rapidly converts aqueous wastes which contain cyanates and lesser amounts of ammonia into materials that can be safely discharged to receiving waters without potential harm to aquatic species.

SUMMARY OF THE INVENTION

The present invention provides an improved process for treating an industrial waste that is to be discharged into receiving waters. The waste contains cyanate and a lesser amount of ammonia or ammonium ion and is in the form of an alkaline aqueous effluent stream or a water-wet solid. The improvement comprises heating the waste to a temperature of at least 50° C. to convert the cyanate and ammonia to urea. In a preferred process, the heated waste stream is acidified to a pH in the range of 2.5 to 5 and then before the stream is discharged into receiving waters, the pH of the stream is increased to at least about 6. In another preferred embodiment, the aqueous waste stream is temporarily impounded and heated by solar energy or by injection of hot combustion gases into the impounded stream. The improved process of the invention rapidly decreases the cyanate concentration of the waste stream to less than about 0.08 gram/liter and the ammonia concentration to less than about 0.0007 g/l, at which concentrations, the treated waste can be safely discharged into receiving waters without endangering aquatic species.

DETAILED DESCRIPTION OF PREFERRED EMBODIMENTS

The invention is further illustrated by the following description of preferred embodiments. These are included for the purposes of illustration and are not intended to limit the scope of the invention, which is defined by the appended claims.

The largest use (on a world-wide basis) of cyanides is for extracting gold and silver from their ores. Over 80% of the world's gold and 30% of the world's silver are recovered by direct exposure of ores to cyanide solutions. These processes result in aqueous effluents and water-wet solids that contain cyanides at concentrations that required detoxification before discharge or abandonment.

Several conventional methods have been used to alleviate potential toxicity problems associated with cyanides in the discharges from mining and electroplating operations. In each method, cyanide moieties are oxidized to cyanates. The oxidation methods respectively include use of alkaline chlorination, copper-catalyzed hydrogen peroxide, copper-catalyzed air plus sulfur dioxide, chlorine dioxide and ozone. Typically, an aqueous waste stream after such oxidation has a pH in the range of 8 to 9 and contains a soluble cyanate salt in a concentration of about 0.02 gram/liter or less, though cyanate concentrations of as high as 0.08 g/l are not uncommon. The ultimate fate of the thusly produced cyanate, which is in itself of low toxicity to both mammalian and aquatic species, generally has not been of concern to environmentalists. However, the conversion of cyanate via hydrolysis to ammonia, as well as other sources of ammonia in these discharges could raise concerns over the toxicity of ammonia to fish.

The present invention provides an improved process for detoxification of ammoniacal residues in cyanate-bearing aqueous waste streams and water-wet waste solids which result from industrial metal recovery and electroplating operations of the types described above. According to the improvement of the invention, the waste streams or solids are heated to a temperature of at least 50° C., but usually to less than 90° C., to promote the conversion of ammonium cyanate to urea. Urea is biodegradable and generally regarded as nontoxic to aquatic species.

The optimum temperature to be employed in the process of the invention depends on the initial concentrations of ammonia and of cyanate and on the amount of time at which the materials can be held at the desired temperature prior to final discharge to receiving waters.

The process of the invention can be applied most economically to waste materials in which the ammonia concentrations are high and impoundment is possible for only short times. For example, about half of the ammonium cyanate in a typical waste stream or waste solid can be converted to urea in 10 to 12 minutes, when the material is heated at 80° C. In contrast, if the stream is maintained at 25° C., the same amount of ammonium cyanate conversion to urea would require about two to three days.

The conversion of ammonium cyanate to urea is believed to be relatively independent of pH, but hydrolysis of cyanate ion itself to ammonium carbonate can be accelerated by decreasing pH. In a preferred process of the invention, the heating is performed with the waste stream under acid conditions. Low pH, for example in the range of 3 to 5, is particularly preferred. Note that cyanate concentrations from a typical cyanide oxidation process generally exceed ammonia levels by one or two orders of magnitude. Thus, the acceleration of cyanate hydrolysis by lowered pH is helpful in generating the ammonium cyanate itself, which is needed to accomplish the conversion of the remaining cyanate to urea. Before discharge of the treated acidic waste into receiving waters, the pH of the waste is readjusted toward neutral, preferably to at least 6.

With regard to ammonia concentrations in aqueous streams, concentrations of 0.3 mg/l have resulted in 96-hour fish mortalities. Usually, in the industrial processes of concern to this invention, the cyanide that is oxidized has a concentration in the range of about 5 mg/l to over 200 mg/l. Approximately 1 mg/l of cyanide converts, via 1.3 mg/l of cyanate, to about 0.7 mg/l of ammonia. Thus, processes that enhance ammonia removal are desirable from an environmental viewpoint.

The improved process of invention is believed to depend on long-known chemical reactions to remove the latent toxicity of ammonia that can be generated by cyanate-bearing wastes streams. The conversion of ammonium cyanate to urea was first studied over 150 years ago. However, the relationship of the known reactions to the potentially adverse environmental effects of cyanates and the ammonia that can be generated therefrom has hitherto not been appreciated. It is believed that some of the equilibrium reactions can be represented as follows.

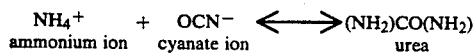 (1)

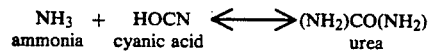 (2)

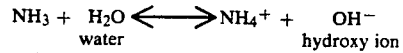 (3)

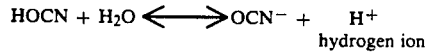 (4)

-continued

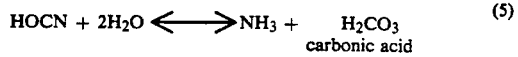 (5)

Reactions (1) and (2) represent the isomerization equilibria between ammonium cyanate and urea. Reaction (3) represents the equilibrium between ammonia and ammonium ion. Reaction (4) similarly represents the equilibrium between cyanic acid and cyanate ion. Reaction (5) represents the reaction between cyanic acid (or cyanate ion) and water to form ammonia, and carbonic acid. Depending on the pH of the system, carbon dioxide, carbonate ions and bicarbonate ions can form. In the process of the the invention, it is inconsequential whether ammonia, cyanate, or carbonate are present in ionic or nonionic form. The reactions set forth above are believed to explain the mechanisms by which urea is formed. Note that all the proposed reactions lead to the same outcome, the formation of urea and the decreasing of the ammonia and ammonium ion concentrations in the waste stream..

In the practice of this invention, the ultimate conversion of ammonia to the very low-toxicity urea is accelerated by increasing the temperature to promote the isomerization Reactions 1 and 2. Optionally, pH of the system can also be lowered, to accelerate the hydrolysis of cyanate and generate more ammonia or ammonium ion to react with the balance of the cyanate.

Thus, when a waste streams is heated in accordance with the invention to a temperature of at least 50° C., the ammonium cyanate content of the waste stream is significantly decreased in about 6 to 9 hours to suitable levels for the environment. Higher temperatures reduce the time needed to achieve the desired decreases in ammonium cyanate.

A typical average day-time temperature in an impoundment pond containing the cyanate-bearing residues to be treated in accordance with the invention is about 30° C. At this temperature, the half-life of ammonium cyanate is about 24 to 36 hours. By heating the impounded materials to a temperature of about 60° C., the half-life of ammonium cyanate is decreased to about 1 to 1½ hours and by heating to about 80° C., the half-life is decreased to about 10 to 15 minutes.

An aqueous stream containing cyanate-bearing waste can be heated in accordance with the invention by any convenient conventional method. The heating can also be accomplished by discharging hot hydrocarbon combustion products directly into the stream. Carbon dioxide in the combustion products also advantageously reduces the pH of the stream. If the fuel that was burned to provide the combustion products contained sulfur compounds, the sulfur oxides produced by the combustion also assist in acidifying the stream (i.e.,lowering its pH). Of course, the pH of the stream can be adjusted in other ways, as noted below.

Because many gold-mining and milling operations take place in sunny or desert areas, solar energy can be used to heat waste streams temporarily impounded in ponds. Heat losses from the pond can be reduced by covering the pond with a transparent material and by using black impoundment liners for absorption of additional solar energy. The temperature desired for treating the impounded waste will, of course, depend on reactant concentrations and on the residence time available.

As noted above, ammonia is required as a co-reactant with the cyanate to form urea. When the initial concentration of ammonia is well below the cyanate chemical equivalency, the hydrolysis of some of the cyanate to ammonium carbonate can be accelerated by providing acid conditions. Note that the effluent solutions from the cyanide oxidations mentioned above are seldom below 8.5. In the industrial operations preceding the waste treatment process of the invention, solutions are maintained alkaline while cyanide is still present, to prevent the release of dangerous concentrations of HCN (hydrocyanic acid). However, the waste materials being treated in accordance with the present invention, have had all the cyanide converted to cyanate. Accordingly, acidifying the waste stream to a pH in the range of 2.5 to 5 does not cause production of dangerous quantities of HCN, but instead enhances the conversion of the cyanate to urea.

In some cases, the cyanate hydrolysis can be a rate-limiting step in the treatment of the waste. In such cases, lowering the pH into the range of 2.5 to 5 can be very useful. pH can be lowered in impoundment ponds by submerged injection of carbon dioxide, even that present in atmospheric air, into the impounded waste. The acidic conditions accelerate the disappearance of ammonia or ammonia-generating potential. Supplemental addition of mineral acids, such as sulfuric acid, can accelerate hydrolysis rate to permit rapid conversion of the cyanates to urea. A pH of about 3 decreases the needed residence time to a matter of hours, rather than days.

EXAMPLE

The following example illustrates the process of the invention and shows the advantageous effects of heating and acidifying a cyanate-bearing stream in accordance with the invention, to produce treated streams having low concentrations of cyanate and ammonia. Such treated streams, when discharged into receiving waters, are harmless to aquatic species.

A simulated sample of an aqueous waste stream containing 0.02 gram/liter of ammonium cyanate and having a pH of about 8.5, is heated to a temperature of about 80° C. for about one hour. At the end of the heating period, each liter of the sample contains about 0.0194 gram of urea and only about 0.0006 gram of ammonium cyanate remains. Further hydrolysis of the cyanate yields ammonium carbonate and ammonia concentrations that would be harmless to aquatic species.

A second simulated sample of an aqueous waste stream containing 0.02 gram per liter of cyanate in the form of the soluble sodium salt, is acidified with sulfuric acid to a pH of about about 3.5. The sample is then heated to a temperature of about 80° C. for about half an hour. At the end of the heating period, each liter of the sample contains about 0.0129 gram of urea and about 0.0007 gram of ammonia. The pH of the sample is readjusted to about 6.5, before it is discharged into a receiving stream. The concentrations of urea and ammonia in the treated sample are harmless to aquatic species.

I claim:

1. In a process for treating waste in the form of an aqueous effluent stream or water-wet solids from an operation in which gold or silver is recovered from ore or in which metals are electroplated wherein the waste contains cyanate salt and ammonia or ammonium ion which were formed by oxidation of cyanide-containing residues, the ammonia or ammonium ion being present at a concentration amounting to one-tenth to one-hundredth of the cyanate concentration, the improvement comprising heating the waste to a temperature of at least 50° C. under acidic conditions to convert the cyanate salt and ammonia or ammonium ion to urea.

2. A process in accordance with claim 1 wherein the waste is an aqueous stream having a pH in the range of 8 to 9 and containing soluble cyanate salt in a concentration of 0.015 to 0.1 gram per liter, the stream is acidified to a pH in the range of 2.5 to 5, and the ammonia content of the thusly treated waste is less than 1 mg/liter.

3. A process of claim 2 wherein the pH of the treated stream is readjusted to a pH of at least 6.

4. A process in accordance with claim 2 wherein the acidification is provided by addition of a mineral acid to the aqueous stream.

5. A process in accordance with claim 2 wherein the aqueous stream is impounded in a pond and the heating and acidification of the impounded materials is performed in the pond.

6. A process in accordance with claim 5 wherein heating is provided by solar energy absorbed by the impounded materials.

7. A process in accordance with claim 5 wherein heating is provided by injection of hot hydrocarbon combustion gases into the impounded materials.

8. A process in accordance with claim 5 wherein the acidification is provided by submerged injection of atmospheric air or carbon dioxide into the impounded materials.

* * * * *